United States Patent
Murray et al.

(10) Patent No.: US 11,912,798 B2
(45) Date of Patent: Feb. 27, 2024

(54) RUBBER WITH BACKBONE AND END-GROUP FUNCTIONALIZATION

(71) Applicant: The Goodyear Tire & Rubber Company, Akron, OH (US)

(72) Inventors: Aaron Patrick Murray, Chardon, OH (US); Thomas Stockman, Brecksville, OH (US); Jiyang Jin, Taizhou (CN)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 119 days.

(21) Appl. No.: 17/545,120

(22) Filed: Dec. 8, 2021

(65) Prior Publication Data
US 2022/0177610 A1 Jun. 9, 2022

Related U.S. Application Data

(60) Provisional application No. 63/123,161, filed on Dec. 9, 2020.

(51) Int. Cl.
| | |
|---|---|
| C08F 2/38 | (2006.01) |
| C08F 136/06 | (2006.01) |
| C08F 230/08 | (2006.01) |
| C08K 5/5445 | (2006.01) |
| B60C 1/00 | (2006.01) |
| C08F 2/06 | (2006.01) |
| C08L 15/00 | (2006.01) |

(52) U.S. Cl.
CPC .............. *C08F 2/38* (2013.01); *B60C 1/0016* (2013.01); *B60C 1/0025* (2013.01); *C08F 2/06* (2013.01); *C08F 230/085* (2020.02); *C08K 5/5445* (2021.01); *C08L 15/00* (2013.01); *C08F 2438/00* (2013.01)

(58) Field of Classification Search
CPC ................................ C08F 2/38; C08F 136/06
See application file for complete search history.

(56) References Cited

U.S. PATENT DOCUMENTS

| | | | |
|---|---|---|---|
| 3,317,458 A | 5/1967 | Clas et al. | |
| 3,768,537 A | 10/1973 | Hess et al. | |
| 3,907,734 A | 9/1975 | Broeck et al. | |
| 4,481,329 A | 11/1984 | Ambler et al. | |
| 4,482,657 A | 11/1984 | Fischer et al. | |
| 4,935,471 A | 6/1990 | Halasa et al. | |
| 5,227,425 A | 7/1993 | Rauline | |
| 5,405,897 A | 4/1995 | Segatta et al. | |
| 5,932,662 A | 8/1999 | Lawson et al. | |
| 6,025,415 A | 2/2000 | Scholl | |
| 6,080,835 A | 6/2000 | Lawson et al. | |
| 6,084,025 A | 7/2000 | Kitamura et al. | |
| 6,306,949 B1 | 10/2001 | Materne et al. | |
| 6,323,260 B1 | 11/2001 | Koski et al. | |
| 6,344,538 B1 | 2/2002 | Sheares | |
| 6,407,153 B1 | 6/2002 | von Hellens | |
| 6,420,456 B1 | 7/2002 | Koski | |
| 6,433,065 B1 | 8/2002 | Lin et al. | |
| 6,465,670 B2 | 10/2002 | Thise | |
| 6,537,612 B1 | 3/2003 | Koski | |
| 6,608,145 B1 | 8/2003 | Lin et al. | |
| 8,124,704 B2 | 2/2012 | Oshima et al. | |
| 8,299,167 B2 | 10/2012 | Oshima | |
| 8,916,665 B2 | 12/2014 | Lawson et al. | |
| 9,458,253 B2 | 10/2016 | Doring et al. | |
| 9,884,923 B2 | 2/2018 | Lawson et al. | |
| 2020/0181389 A1 | 6/2020 | Murray et al. | |

FOREIGN PATENT DOCUMENTS

| | | |
|---|---|---|
| EP | 26799628 B1 | 3/2016 |
| EP | 3663101 A1 | 6/2020 |

OTHER PUBLICATIONS

European Search Report for European Patent Application No. 21211596.8 dated May 3, 2022 which is the European counterpart to the subject patent application.

*Primary Examiner* — Catherine S Branch
(74) *Attorney, Agent, or Firm* — Alvin T. Rockhill

(57) ABSTRACT

Novel functionalized rubbers having low hysteresis and good compatibility with fillers, such as carbon black and silica, have been synthesized. These functionalized rubbers, including functionalized polybutadiene rubber and functionalized styrene-butadiene rubber, can be beneficially used in making a wide variety of rubber products that have enhanced physical properties. These improved properties are realized because the functional groups therein improve compatibility with reinforcing fillers that are typically included in such rubber compounds. These functionalized rubbers are comprised of polymer chains of the structural formula:

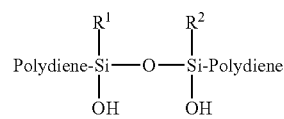

wherein Polydiene represents a polymer chain which is comprised of at least one diene monomer and wherein $R^1$ and $R^2$ can be the same or different and represent alkyl groups containing form 1 to 8 carbon atoms. These rubbers can also be functionally terminated with a silicon containing terminator.

20 Claims, No Drawings

RUBBER WITH BACKBONE AND END-GROUP FUNCTIONALIZATION

This application claims benefit of U.S. Provisional Patent Application Ser. No. 63/123,161, filed on Dec. 9, 2020. The teachings of U.S. Provisional Patent Application Ser. No. 63/123,161 are incorporated herein by reference in their entirety.

BACKGROUND OF THE INVENTION

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitrites having the structural formula X-A-C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pyridinyl group, a O-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

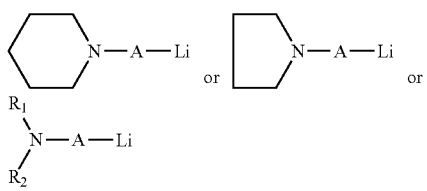

wherein A represents an alkylene group containing from 1 to 20 carbon atoms, and wherein $R_1$ and $R_2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the rubber. This can be of practical importance in improving the physical characteristics of rubber articles that are made utilizing polydiene rubbers. For example, the rolling resistance and tread wear characteristics of tires can be improved by increasing the affinity of carbon black to the rubbery polymers utilized therein. Therefore, it would be highly desirable to improve the affinity of a given polydiene rubber for carbon black and/or silica. This is because a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

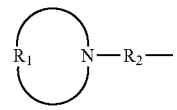

where R1 is a selected from the group consisting of a divalent alkylene group, an oxy-alkylene group, an amino alkylene group, and a substituted alkylene group, each group having from about 6 to about 20 carbon atoms, $R_2$ is covalently bonded to the elastomer and is selected from the group consisting of a linear-alkylene group, a branched-alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula

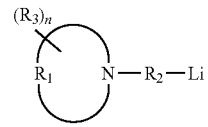

wherein $R_1$ is a divalent alkylene, an oxy- or amino-alkylene having from 6 to about 20 carbon atoms; and, $R_2$ is a linear-alkylene, branched-alkylene, or cyclo-alkylene having from about 2 to about 20 carbon atoms, Li is a lithium atom bonded directly to a carbon atom of $R_2$; and $R_3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula:

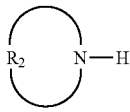

where $R_2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_yLi$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_yLi$ with from about 0.01 to about 2 equivalents per equivalent of lithium of a chelating reagent, and an organic alkali metal compound selected from compounds having the formula $R_4OM$, $R_5C(O)OM$, $R_6R_7NM$, and $R_8SO_3M$, where $R_4$, $R_5$, $R_6$, $R_7$, and $R_8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

In the initiator systems of U.S. Pat. No. 6,084,025 a chelating reagent can be employed to help prevent heterogeneous polymerization. The reagents that are reported as being useful include tetramethylethylenediamine (TMEDA), oxolanyl cyclic acetals, and cyclic oligomeric oxolanyl alkanes. The oligomeric oxolanyl alkanes may be represented by the structural formula:

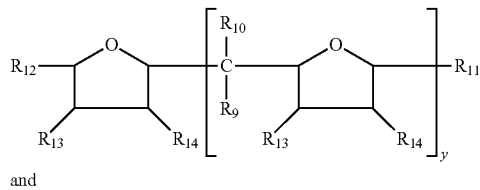

and

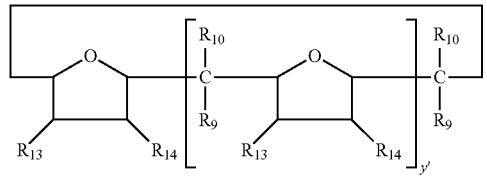

wherein $R_9$ and $R_{10}$ independently are hydrogen or an alkyl group and the total number of carbon atoms in $-CR_9R_{10}-$ ranges between one and nine inclusive; y is an integer of 1 to 5 inclusive; y' is an integer of 3 to 5 inclusive; and $R_{11}$, $R_{12}$, $R_{13}$, and $R_{14}$ independently are $-H$ or $-C_nH_{2n+1}$, wherein n=1 to 6.

U.S. Pat. No. 6,344,538 discloses functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1,3-butadiene, 2-(aminomethyl)-1,3-butadiene, 2-(hydroxymethyl)-1,3-butadiene, 2-(carboxymethy)-1,3-butadiene, 2-(acetoxymethyl)-1,3-butadiene, 2-(2-alkoxy-2-oxoethyl)-1,3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis(3-cyanopropyl)-1,3-butadiene, and methods for preparing such functionalized diene monomers and polymers.

In recent years, a considerable interest in silica reinforced rubber articles, such as tires, has developed. For instance, U.S. Pat. No. 5,227,425 indicates that tires made with tread formulations that contain silica exhibit a number of important performance advantages over tires manufactured using carbon black as the filler. The utilization of silica in tire tread formulations is believed to (a) lower rolling resistance, (b) provide better traction on snow, and (c) lower noise generation, when compared with conventional tires filled with carbon black.

U.S. Pat. No. 5,227,425 discloses a sulfur-vulcanizable rubber composition obtained by thermomechanical work of a conjugated diene compound and an aromatic vinyl compound prepared by solution polymerization in a hydrocarbon solvent having a total content of aromatic vinyl compound of between 5% and 50% and a glass transition temperature (Tg) of between 0° and −80° C. with 30 to 150 parts by weight per 100 parts by weight of elastomer of a silica having a BET surface area of between 100 and 250 m²/g, a CTAB surface area of between 100 and 250 m²/g, an oil absorption measured in DBP of between 150 and 250 ml/100 g, and an average projected area of the aggregates greater than 8500 nm² before use and between 7000 and 8400 nm² after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

Sometimes rubber for tires is supplied by a rubber producer to a tire manufacturer in the form of a masterbatch containing an elastomer, an oil extender, and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubbery elastomer.

A number of techniques have been developed to incorporate such reinforcing agents and fillers into the polymer compositions, including both wet and dry blending processes. The incorporation of silica and carbon black as reinforcing agents and/or fillers into rubbery elastomers is far more complex than one might initially believe. One problem in wet blending of silica with latices of such polymers arises from the fact that the hydrophilic silica has a tendency to associate with the aqueous phase and not blend uniformly with the hydrophobic polymer.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric latices; notably among them are quaternary alkylated ammonium halides (see German Patent No. 1,188, 797). It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113 aqueously wet silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice, used commercially, is the technique of dry blending either silica, carbon black or both of them into rubber and thermoplastic polymers in a high-shear milling operation. That practice has many limitations. Notable among them include the tendency of the filler particles to agglomerate to each other, resulting in nonuniform dispersion of the filler throughout the polymer constituting the continuous phase. Another problem commonly experienced in such high-shear milling operations is the tendency of the polymers to degrade during milling. That necessitates the use of higher molecular weight polymers, which sometimes require the incorporation of various types of processing aids to facilitate mixing and dispersion of the filler particles into the polymer constituting the continuous phase. The cost associated with the use of such processing aids also increases the manufacturing cost of the polymeric compound or article and can lead to diminished product performance. The use of processing aids has the further disadvantage in that such processing aids may have a negative effect on the cure or end use of the polymer. Such dry blending techniques also result in additional processing costs, in part due to excessive equipment wear caused by the abrasive fillers.

To improve dispersion of the silica during dry mixing, it has been proposed that such compounding operations employ a silica which has been treated with an organosilane coupling agent having dual functionality. Representative of such coupling agents are those well-known compounds that include both an organic group, such as an amino alkyl group, a mercaptoalkyl group, or a polysulfidic-bis-organo alkoxy silane group bonded directly to the silicon atom along with a readily hydrolyzable group, such as an alkoxy group as represented by a methoxy group or an ethoxy group, likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/or scorching.

In an effort to overcome the problems associated with the use of silane coupling agents, it has been proposed in U.S. Pat. No. 5,405,897 to employ phenoxy acidic acid along with a methylene donor in place of the conventional organosilanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, U.S. Pat. Nos. 3,055,956 and 3,767,605 describe an emulsion polymerization process from making rubbery polymer compositions wherein carbon black in the form of a slurry is added directly to the latex of the polymer being made followed by coagulation and recovery of a rubber-carbon black masterbatch. Such processes work well with carbon black, but fail to incorporate substantial amounts of fine particulate silica. U.S. Pat. No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. The presence of a quaternary ammonium halide in this process necessitates the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The fumed silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent 2,558,008 and French Patent 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or non-ionic polyoxyethylene. Such free agents are wholly incompatible with typical coagulation techniques used in the recovery of the emulsion process polymers.

It is well known that mercaptosilanes offer excellent coupling between rubber and silica, resulting in rubber compounds for tire treads with improved wet and ice skid resistance, rolling resistance and treadwear even at low loadings. For instance, U.S. Pat. No. 3,768,537 demonstrates the excellent compound properties that can be attained by the use of mercaptosilanes in silica loaded rubber compounds. However, as revealed by U.S. Pat. No. 6,433,065, the high reactivity of mercaptosilanes makes it impractical to use such silane coupling agents in applications where conventional Banbury mixing is employed. In cases where mercaptosilane coupling agents are used in silica compounds it is important to maintain a low temperatures (120° C. to 145° C.) to avoid premature crosslinking which proves to be a problem at higher temperatures. However, low mixing temperatures result in a marked reduction in the mechanical efficiency of mixing that is essential for an optimum dispersion of the silica. The longer mixing time at a low temperature results in a significant reduction in mixing productivity which in turn increases expense. Another drawback of using low temperatures for mixing without extended mixing duration is that less completed silanization occurs which results in the release of ethanol in downstream operations giving rise to porosity from the extrudate and reduced extrusion rates.

Using a combination of two silane coupling agents in silica compounds has been suggested in the patent literature. U.S. Pat. No. 6,306,949 discloses the use of a combination of an organosilane disulfide and an organosilane tetrasulfide for silica compounds for enhanced processability and improved compound properties. In such a process, the organosilane disulfide coupling agent is introduced during the non-productive stage of the mixing so that higher mixing temperatures can be used to mix the silica compounds to ensure a better dispersion of silica throughout the rubber compound. The organosilane tetrasulfide is introduced during the productive stage where the mixing temperature is low (100° C. to 120° C.) so that scorch of the compounds from premature crosslinking can be avoided. However, the very low temperature and short duration during the final pass of the mixing will not ensure sufficient silanization of the organosilane tetrasulfide in the silica compounds during compounding. Since the rate of silanization for tetrasulfide-type silane coupling agents is very low at a temperature lower than 120° C., ethanol is accordingly released during downstream operations, such as extrusions and curing.

U.S. Pat. No. 6,433,065 teaches the use of a small amount of a mercaptosilane coupling agent in combination with an allyl alkoxysilane for silica or silica/carbon black compounds in Banbury mixing. It is claimed that very high temperature mixing (170° C. to 185° C.) can be conducted without causing premature crosslinking of the compounds. U.S. Pat. No. 6,608,145 discloses the use of a small quantity of a organosilane tetrasulfide, bis(triethoxylsilylpropyl)tetrasulfide (TESPT) in combination with an allyl alkoxysilane. It is again claimed that very high temperatures (165° C. to 200° C.) could be used to mix silica or silica/carbon black compounds by Banbury mixing without causing premature crosslinking of the compounds. However, having a non-coupling silane (allyl alkoxysilane) in the silica compounds is not expected to enhance the interaction between silica and the polymeric chain, hence the performance of the silica compounds. U.S. Pat. Nos. 6,433,065 and 6,608,145 do not teach the use of mercaptosilane, singly or in combination with allyl alkoxysilane, for the preparation of silica masterbatches in a solvent system.

Different approaches are disclosed in the patent literature for the preparation of silica masterbatches. U.S. Pat. No. 5,985,953 reveals the preparation of emulsion styrene-butadiene rubber (e-SBR) based silica masterbatches. U.S. Pat. No. 6,433,064 discloses a rubber composition based on emulsion styrene-butadiene rubber and a two-step process for making such a composition. U.S. Pat. Nos. 6,407,153, 6,420,456, and 6,323,260 describe processes by which silica particles are first treated with a compound containing amino and silane groups, followed by treatment with a silane compound containing a hydrophobic group. Similarly, U.S. Pat. No. 6,537,612 discloses a process through which the silica particles are treated with different chemical species to render the silica surface hydrophobic. The treated silica is then mixed with solution styrene-butadiene rubber or polybutadiene rubber cement to make elastomer masterbatches. However, an aqueous silica slurry is the starting material for the preparation of the silica masterbatch in all those approaches. Either the silica slurry is prepared by mixing water with silica or an aqueous silica slurry from the precipitated silica production process which is used directly in making silica masterbatches. Silica slurries are used in those approaches on the basis of the conventional thinking that because of the hydrophilic nature of silica, water would be the ideal medium for the treatment of the silica in the preparation of silica masterbatches.

It is well known to those skilled in the art that it is difficult for the silane coupling agents to react directly with silica in an aqueous medium. Hence, transfer agents are disclosed in U.S. Pat. No. 6,465,670 and French Patent 2,804,119 to increase the chance for the silane coupling agent to react with the silica surface. U.S. Pat. Nos. 6,407,153 and 6,420,456 disclose the use of amino silane with alkyl terminations before introducing silane coupling agents. In addition to being a more complex process, the introduction of other chemical species prior to silane coupling agents render some of the reactive sites on the silica surface unavailable for the silanization process.

U.S. Pat. No. 6,025,415 discloses a process through which silica powder could be rendered water-repellent and the dried water-repellent silica could be incorporated into solution elastomer cements in an organic solvent.

The size of the rubber crumb and the absence of fines in the rubber/water mixer from steam stripping operations are important parameters for successful down stream operations, such as dewatering using a shaker screen and an expeller and drying using an expander. U.S. Pat. No. 6,323,260 reveals that the speed of the agitation during the steam stripping operation needs to be reduced to ensure a relative large size of the crumb. However, reducing the speed of the agitation during the steam stripping operation also significantly reduce the efficiency of the steam stripping operation to remove organic solvents.

U.S. Pat. No. 8,124,704 discloses a process for producing a conjugated diene polymer, comprising the steps of:
(A) contacting an organoalkali metal compound catalyst having 2 to 20 carbons and a silicon compound in a hydrocarbon solvent to prepare a reaction product of the organoalkali metal compound catalyst and the silicon compound, wherein the silicon compound is represented by the formula:

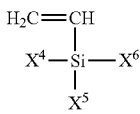

wherein $X^4$, $X^5$, and $X^6$ independently denote a group represented by a hydrocarbyl group, a substituted hydrocarbyl group, or a moiety of the formula:

wherein $R_2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure;

(B) polymerizing a monomer comprising a conjugated diene by contacting the monomer with the reaction product prepared in Step A and the monomer comprising a conjugated diene in a hydrocarbon solvent to prepare a polymer having at a polymer chain terminal an alkali metal originating from the organoalkali metal compound catalyst; and (C) reacting a silicon compound with a polymer chain terminal, of the polymer prepared in Step B, having the alkali metal originating from the organoalkali metal compound catalyst by contacting the silicon compound with the polymer in a hydrocarbon solvent.

U.S. Pat. No. 8,124,704 further discloses a conjugated diene polymer comprising: a conjugated diene-based constituent unit; and a group represented by formula:

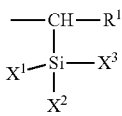

at both termini of a polymer chain; $R^1$ denotes a hydrogen atom, a hydrocarbyl group having 1 to 20 carbons, or a substituted hydrocarbyl group having 1 to 20 carbons, $X^1$, $X^2$, and $X^3$ independently denote a hydroxy group, a hydrocarbyl group, or a substituted hydrocarbyl group, or a group represented by formula:

wherein $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure, and wherein and at least one selected from among $X^1$, $X^2$, and $X^3$ is a group represented by the formula:

or a hydroxy group.

U.S. Pat. No. 9,458,253 discloses certain modified macromolecular compounds obtainable by using specific amino silane polymerization initiator compounds and optionally chain end-modifying compounds. This patent further describes polymer compositions including such modified macromolecular compounds and the use of such compositions in the preparation of vulcanized (crosslinked) elastomeric polymer compositions and articles.

U.S. Pat. No. 9,884,923 discloses a metallated aminosilane compound for initiating an anionic polymerization comprising the reaction product of at least one metallating agent and at least one alkylaminosilane compound having the formula:

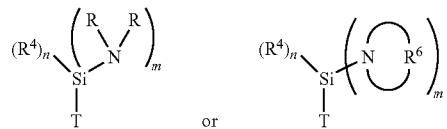

where n is a whole number selected from the group consisting of 0-2, and m is a whole number selected from the group consisting of 1-3, with the proviso that the sum of m and n equals 3; where T (the "tether" group) is a methyl, ethyl, propyl, or allylic group; where each $R_4$ and $R^5$ is independently a hydrocarbyl group; where each $R^6$ is independently a hydrocarbylene; and where one or more $R^5$ may form a bridge between two nitrogen atoms when m is greater than 1. This patent also discloses the use of such functional initiators in the synthesis of aminosilane-functionalized polymers, such as styrene-butadiene rubber U.S. Pat. No. 8,916,665 discloses a telechelic polymer is made by a method comprising the steps of: (a) initiating polymerization of at least one type of anionically polymerizable monomer by using an initiator comprising the reaction product of at least one metallating agent and at least one aminosilane compound having the formula:

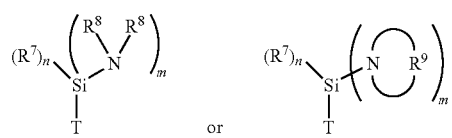

where n is a whole number selected from the group consisting of 0-2, and m is a whole number selected from the group consisting of 1-3, with the proviso that the sum of m and n equals 3; where X is a methyl, ethyl, propyl, alkenyl, or allylic group; where each $R^7$ and $R^8$ is independently a hydrocarbyl group; where each $R^9$ is independently a hydrocarbylene group; and where one or more $R^8$ may form a bridge between two nitrogen atoms when m is greater than 1; (b) propagating the polymerization of at least one type of anionically polymerizable monomer; and (c) providing a functional terminator, thereby producing a polymer that includes at least one aminosilane group at the head of the polymer and at least one functional group at the tail of the polymer.

SUMMARY OF THE INVENTION

The present invention relates to functionalized rubbers having low hysteresis and good compatibility with fillers, such as carbon black and silica. These functionalized rubbers can be beneficially used in making a wide variety of rubber products that have enhanced physical properties. These rubbery polymers include, functionalized high cis-1, 4-polybutadiene rubber, functionalized polyisoprene rubber, functionalized styrene-butadiene rubber, functionalized styrene-isoprene rubber, functionalized styrene-isoprene-butadiene rubber, and the like. In any case, improved polymer properties are realized because the functionalized groups therein improve the compatibility of the rubber with the types of fillers that are typically used in rubber compounds; such as carbon black and silica.

The subject invention more specifically discloses an end-group functionalized rubber which is the reaction product of (1) a living rubbery polymer; and (2) a polymerization terminator of formula I

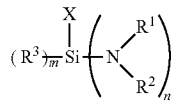

where X is Cl, Br, or I;

m is an integer from 0 to 2, n is an integer from 1 to 3, with the proviso that n+m=3;

$R^1$, $R^2$ are independently C1 to C18 alkyl, aryl, or a combination thereof, or $R^1$, $R^2$ are independently —$SiR^3$ where R is independently alkyl, aryl, alkoxy, or disubstituted amino, or $R^1$ and $R^2$ taken together with their common nitrogen atom and optionally a sulfur or oxygen heteroatom to form a five to eight membered ring;

R3 is hydrogen, or C1 to C18 alkyl, aryl, or a combination thereof, or $R^3$ is —$SiR^3$ where R is independently alkyl, aryl, alkoxy, or disubstituted amino, or $R^3$ is —$R^6$-$R^7$, where $R^6$ is C1 to C3 alkanediyl and $R^7$ is selected from the following structures —S—Z, —N($R^8$)($R^9$), —O(Y), or Si($OR^{10}$)$_3$, where $R^8$ and $R^9$ are independently C1 to C18 alkyl, aryl, or a combination thereof;

Y and Z are independently selected from the group consisting of methoxymethyl, tetrahydropyranyl, tetrahydrothiopyranyl, tetrahydrofuranyl, tert-butyl, allyl, 1-ethoxyethyl, benzyl, triphenylmethyl, triethylsilyl, triisopropylsilyl, trimethylsilyl, tert-butyl dimethyl silyl, tert-butyl diphenyl silyl, and isopropyldimethylsilyl, and $R^{10}$ are independently C1 to C4 alkyl;

or when m=1, or a polymerization terminator of formula II

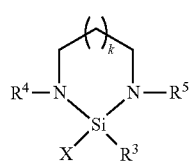

where $R^4$, $R^5$ are independently C1 to C18 alkyl, aryl, or a combination thereof, or $R^4$, $R^5$ are independently —$SiR_3$ where R is independently alkyl, aryl, alkoxy, or disubstituted amino, X and $R^3$ are as defined previously, and k is an integer from 0 to 10; wherein the living rubbery polymer is comprised of polymer chains having functional groups of the structure

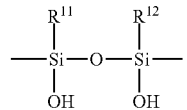

in the backbone thereof, and wherein $R^{11}$ and $R^{12}$ can be the same or different and represent alkyl groups containing form 1 to 8 carbon atoms. Some representative examples of the polymerization terminators that can be used include those having any of the following structures:

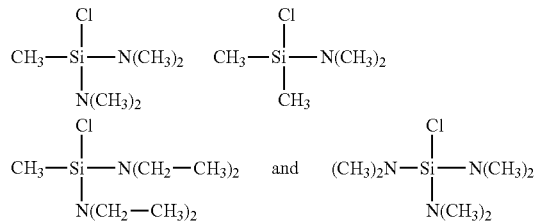

These functional terminators and there use in functionalizing living polymer is further described in U.S. patent application Ser. No. 16/544,187 which has been published as United States Patent Application Publication No. 2020/0181310 A1. The teachings of United States Patent Application Publication No. 2020/0181310 A1 are incorporated herein by reference.

The subject invention also reveals a functionalized rubber which is comprised of polymer chains of the structural formula:

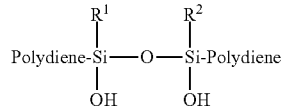

wherein Polydiene represents a polymer chain which is comprised of at least one diene monomer and wherein $R^1$ and $R^2$ can be the same or different and represent alkyl groups containing form 1 to 8 carbon atoms.

The present invention further reveals a method of synthesizing a functionalized rubber which comprises the steps of (1) initiating the polymerization of a conjugated diene monomer in an inert organic liquid medium with a functionalized lithium initiator of the structural formula:

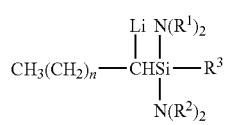

wherein n is an integer from 1 to 8, wherein $R^1$, $R^2$, and $R^3$ can be the same or different and are selected from alkyl groups containing from 1 to 8 carbon atoms; (2) allowing the polymerization to continue in the inert organic liquid medium until a desired level on monomer conversion has been attained to produce a rubbery polymer having living polymer chains; (3) adding a polymerization terminator to the living polymer chains to produce the functionalized rubber which has polymer chains of the structural formula:

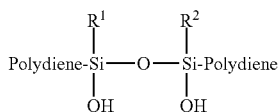

wherein Polydiene represents polymer chains which are comprised of at least one diene monomer and wherein $R^1$ and $R^2$ can be the same or different and represent alkyl groups containing form 1 to 8 carbon atoms; (4) distributing throughout the inert organic liquid medium an acid and water under conditions of agitation; and (5) recovering the functionalized rubber from the inert liquid organic medium.

The subject invention also describes a pneumatic tire which is comprised of a generally toroidal-shaped supporting carcass with an outer circumferential tread, two spaced beads, at least one ply extending from bead to bead, sidewalls extending radially from and connecting said tread to said beads, wherein said circumferential tread is adapted to be ground-contacting, and wherein the tread and/or the sidewalls of the tire are comprised of the functionalized rubber.

The initiation pathway and termination step of this process can more specifically be depicted as follows:

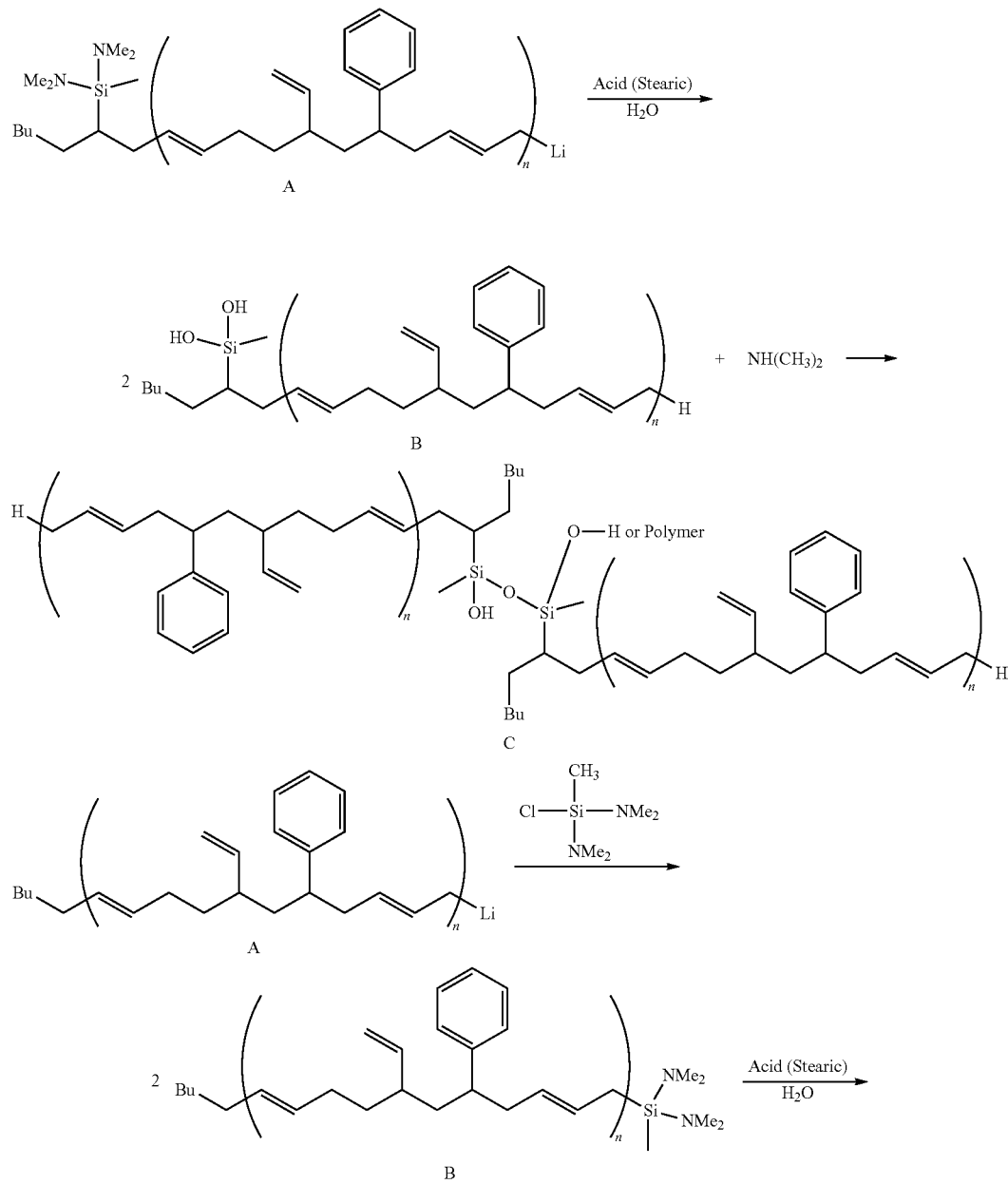

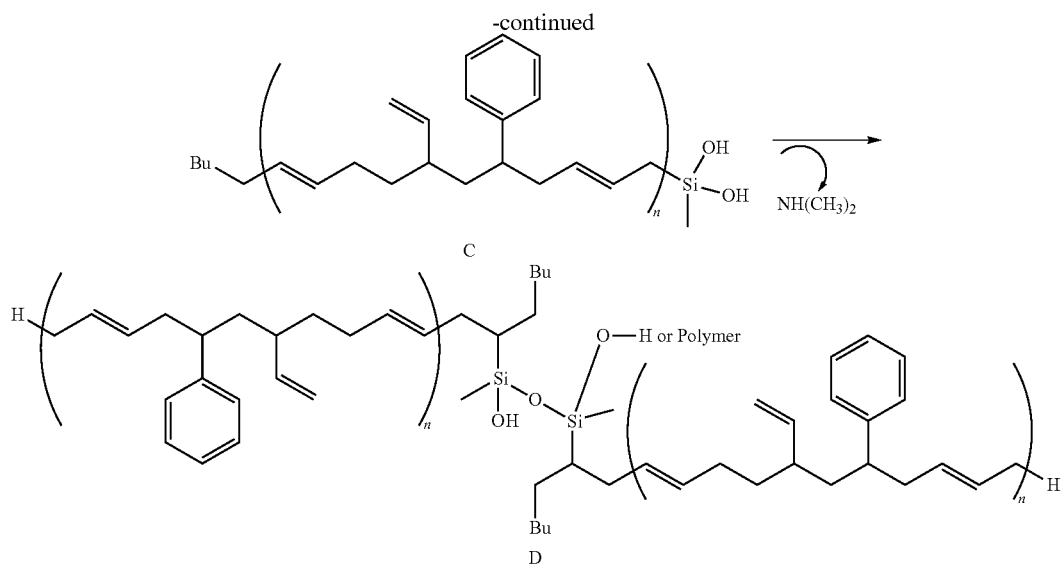

DETAILED DESCRIPTION OF THE INVENTION

A wide variety of functionalized rubbers can be made in accordance with this invention. These rubbers will normally be homopolymers or copolymers of conjugated diolefin monomers and can further contain vinyl aromatic monomers. The polymerizations used in synthesizing the functionalized rubbers of this invention are normally carried out as solution polymerizations in an inert organic medium utilizing a lithium catalyst. The vinyl content of the functionalized rubbery polymer made is controlled by the amount of modifier present during the polymerization.

The rubbery polymers synthesized using the modifiers of this invention can be made by the homopolymerization of a conjugated diolefin monomer or by the copolymerization of a conjugated diolefin monomer with a vinyl aromatic monomer. It is, of course, also possible to make rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be copolymerized into rubbery polymers using the modifiers of this invention include alkyl acrylates, such as methyl acrylate, ethyl acrylate, butyl acrylate, methyl methacrylate and the like; vinylidene monomers having one or more terminal CH2=CH— groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; μ, β-olefinically unsaturated nitriles, such as acrylonitrile and methacrylonitrile; μ, β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers which can be functionalized in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber.

Functionalized high vinyl polybutadiene rubber and styrene-butadiene rubbers made in accordance with this invention typically contain from 0 to 40 weight percent styrene and from 60 weight percent to 100 weight percent 1,3- butadiene. The functionalized styrene-butadiene rubber of this invention will more typically contain from 15 to 40 weight percent bound styrene and from 60 to 85 weight percent bound 1,3-butadiene. For instance, the functionalized styrene-butadiene rubber of this invention can contain from 18 to 24 weight percent styrene and from 76 to 82 weight percent 1,3-butadiene or from 24 to 32 weight percent styrene and from 68 to 76 weight percent 1,3-butadiene or 32 to 40 weight percent styrene and from 60 to 68 weight percent 1,3-butadiene.

In solution polymerizations the inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with functionalized initiator, the polymerization reaction, or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The functionalized lithium initiators which are used in synthesizing the functionalized rubbers of this invention are of the structural formula:

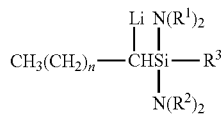

wherein n is an integer from 1 to 8, wherein R groups can be the same or different and represents hydrogen atoms or alkyl groups containing from 1 to 4 carbon atoms, $R^1$, $R^2$, and $R^3$ can be the same or different and are selected from alkyl groups containing from 1 to 8 carbon atoms. It is normally preferred for n to represent an integer from 3 to 5 with it being most preferred for n to represent 4. It normally preferred for $R^1$, $R^2$, and $R^3$ to represent alkyl groups containing from 1 to 4 carbon atoms with it being more preferred for $R^1$, $R^2$, and $R^3$ to represent alkyl groups containing from 1 or 2 carbon atoms (for $R^1$, $R^2$, and $R^3$ to be methyl or ethyl groups). For instance a highly preferred functionalized initiator is of the formula:

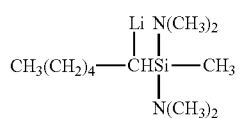

These functional initiators are made by reacting an alkyl lithium compound with a bis-(dialkylamino)vinylalkylsilane in an inert organic solvent in the presence of a polar modifier, such as tetramethylethylenediamine (TMEDA). This reaction can be depicted as follows:

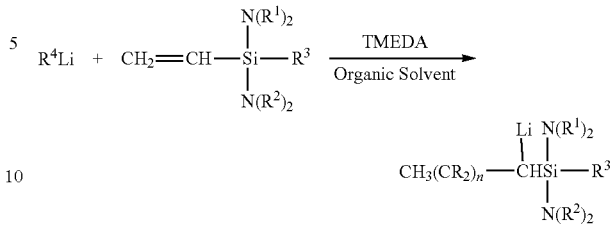

wherein n is an integer from 1 to 8, wherein R groups can be the same or different and represents hydrogen atoms or alkyl groups containing from 1 to 4 carbon atoms, wherein $R^1$, $R^2$, and $R^3$ can be the same or different and are selected from alkyl groups containing from 1 to 8 carbon atoms and wherein $R^4$ is an alkyl group containing from 1 to 7 carbon atoms. In cases where normal-butyl lithium is reacted with bis-(dimethylamino)vinylmethylsilane in a hexane solvent in the presence of tetramethylethylenediamine (TMEDA) this reaction can be depicted as follows:

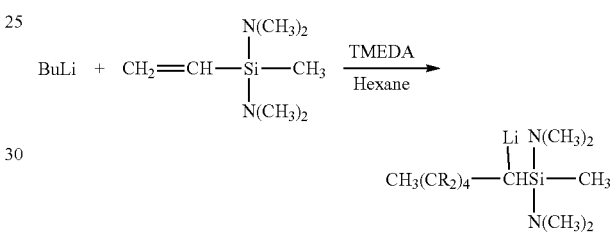

The organolithium compounds which are preferred for use in making the functionalized initiator can be represented by the formula: R—Li, wherein R represents a hydrocarbyl radical containing from 1 to about 20 carbon atoms. Generally, such monofunctional organolithium compounds will contain from 1 to about 7 carbon atoms and will be alkyl lithium compounds. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Organo monolithium compounds, such as alkyllithium compounds and aryllithium compounds, are usually employed. Some representative examples of preferred organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

In making the functionalized initiator a stoichiometric ratio of the lithium compound to the bis-(dialkylamino) vinylalkylsilane will typically be used. For instance, the molar ratio of mono-lithium compounds to bis-(dialkylamino)vinylalkylsilane will typically be within the range of 0.5:1 to 1.2:1 with molar ratios which are within the range of 0.9:1 to 1.1:1 being preferred.

As previously noted, the lithium compound is reacted with the bis-(dialkylamino)vinylalkylsilane in the presence of a polar modifier to make the functionalized initiator. The polar modifier used is typically selected from ethers and tertiary amines which act as Lewis bases. Some representative examples of polar modifiers that can be utilized include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine, 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, 5-propyl-1,2,3-trimethoxybenzene, 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene.

The amount of functionalized lithium initiator utilized in synthesizing the functionalized rubber will vary from one functionalized lithium initiator to another and with the molecular weight that is desired for the functionalized rubber being synthesized. As a general rule, as in all anionic polymerizations, the molecular weight (Mooney viscosity) of the polymer produced is inversely proportional to the amount of catalyst utilized. In any case, from about 0.01 phm (parts per hundred parts by weight of monomer) to 1 phm of the functionalized lithium catalyst will typically be employed. In most cases, from 0.01 phm to 0.1 phm of the functionalized lithium catalyst will be employed with it being preferred to utilize 0.025 phm to 0.07 phm of the functionalized lithium initiator.

Normally, the polymerization medium will be charged with from about 5 weight percent to about 35 weight percent of monomer(s), based upon the total weight of the polymerization medium (including the organic solvent and monomers). In most cases, it will be preferred for the polymerization medium to contain from about 10 weight percent to about 30 weight percent monomer. It is typically more preferred for the polymerization medium to contain from about 20 weight percent to about 25 weight percent monomer.

The microstructure of the rubbery polymer being synthesized is somewhat dependent upon the polymerization temperature. In any case, the polymerization temperature will normally be within the range of about 5° C. to about 100° C. The polymerization temperature will preferably be within the range of about 40° C. to about 90° C. for practical reasons and to attain the desired polymer microstructure. Polymerization temperatures within the range of about 60° C. to about 90° C. are generally most preferred.

To increase the level of vinyl content the polymerization is normally carried out in the presence of at least one polar modifier. The types of polar modifiers previously described for use in making the functionalized lithium initiator can be used for this purpose. In fact, the polymerization can be carried out with the same polar modifier as was employed in making the functionalized lithium initiator, such as TMEDA. Ethers and tertiary amines which act as Lewis bases as well 1,2,3-trialkoxybenzenes and 1,2,4-trialkoxybenzenes are representative examples of polar modifiers that can be utilized in the polymerization for the purpose of increasing the vinyl content of the rubbery polymer being synthesized. Dipiperidinoethane, dipyrrolidinoethane, N,N, N',N'-tetramethylethylenediamine (TMEDA), diethylene glycol, dimethyl ether, and tetrahydrofuran are representative of highly preferred modifiers.

U.S. Pat. No. 4,022,959 describes the use of ethers and tertiary amines as polar modifiers in greater detail. The utilization of 1,2,3-trialkoxybenzenes and 1,2,4-trialkoxybenzenes as modifiers is described in greater detail in U.S. Pat. No. 4,696,986. The teachings of U.S. Pat. Nos. 4,022,959 and 4,696,986 are incorporated herein by reference in their entirety for the purpose of describing polar modifiers and the way that they can be used in modifying the polymerization of rubbery polymers.

In any case, the microstructure of the repeat units which are derived from conjugated diolefin monomers is a function of the polymerization temperature and the amount of polar modifier present. For example, it is known that higher polymerization temperatures result in lower vinyl contents (lower levels of 1,2-microstructure). Accordingly, the polymerization temperature, quantity of modifier, and specific modifier selected will be determined with the ultimate desired microstructure of the functionalized rubber being synthesized being kept in mind.

It has been found that a combination of a metal salt of a cyclic alcohol and a polar modifier act synergistically to increase the vinyl content of rubbery polymer synthesized in their presence. The utilization of this synergistic modifier system can also be employed advantageously in the synthesis of a wide variety of functionalized rubbery polymers, such as functionalized high vinyl polybutadiene rubber, functionalized styrene-butadiene rubber (SBR), functionalized styrene-isoprene-butadiene rubber (SIBR), and functionalized isoprene-butadiene rubber.

The metal salt of the cyclic alcohol will typically be a Group Ia metal salt. Lithium, sodium, potassium, rubidium, and cesium salts are representative examples of such salts with lithium, sodium, and potassium salts being preferred. Sodium salts are typically the most preferred. The cyclic alcohol can be mono-cyclic, bi-cyclic or tri-cyclic and can be aliphatic or aromatic. They can be substituted with 1 to 5 hydrocarbon moieties and can also optionally contain hetero-atoms. For instance, the metal salt of the cyclic alcohol can be a metal salt of a di-alkylated cyclohexanol, such as 2-isopropyl-5-methylcyclohexanol or 2-t-butyl-5-methylcyclohexanol. These salts are preferred because they are soluble in hexanes as well as most other common organic solvents. Metal salts of disubstituted cyclohexanol are highly preferred because they are soluble in for this reason and because they provide similar modification efficiencies to sodium t-amylate. Sodium mentholate is a highly preferred metal salt of a cyclic alcohol that can be employed in the practice of this invention. Metal salts of thymol can also be utilized. The metal salt of the cyclic alcohol can be prepared by reacting the cyclic alcohol directly with the metal or another metal source, such as sodium hydride, in an aliphatic or aromatic solvent.

The molar ratio of the metal salt of the cyclic alcohol to the polar modifier will normally be within the range of about 0.1:1 to about 10:1 and the molar ratio of the metal salt of the cyclic alcohol to the lithium initiator will normally be within the range of about 0.01:1 to about 20:1. It is generally preferred for the molar ratio of the metal salt of the cyclic alcohol to the polar modifier to be within the range of about 0.2:1 to about 5:1 and for the molar ratio of the metal salt of the cyclic alcohol to the lithium initiator to be within the range of about 0.05:1 to about 10:1. It is generally more preferred for the molar ratio of the metal salt of the cyclic alcohol to the polar modifier to be within the range of about 0.5:1 to about 1:1 and for the molar ratio of the metal salt of the cyclic alcohol to the lithium initiator to be within the range of about 0.2:1 to about 3:1.

The polymerization is allowed to continue until essentially all of the monomer has been exhausted. In other words, the polymerization is allowed to run to completion. Since a lithium catalyst is employed to polymerize the monomer, a living polymer is produced. The living polymer synthesized will typically have a number average molecular weight which is within the range of about 25,000 to about 700,000. The rubber synthesized will more typically have a number average molecular weight which is within the range of about 150,000 to about 400,000.

After the desired level of monomer conversion has been attained, a functionalized terminator is added to the polymerization medium (the inert organic liquid medium in which the polymerization is conducted). Some representative examples of functional terminators that can be used include compounds of the following structural formulas:

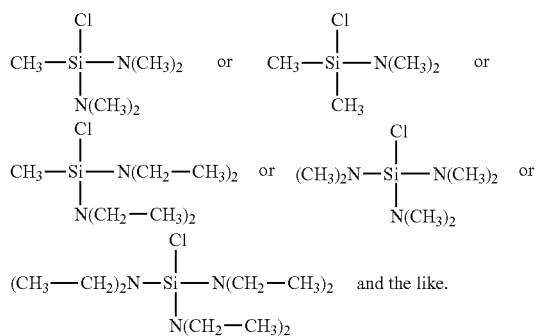

The reaction with the functional terminator causes the functional groups in the polymer to react forming functionalization in the backbone of the living rubbery polymer. Such functionalized living polymers are of the formula:

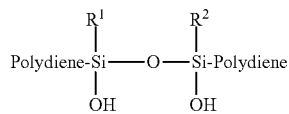

wherein Polydiene and Polydiene represents polymer chains which are comprised of at least one diene monomer and wherein $R^1$ and $R^2$ can be the same or different and represent alkyl groups containing form 1 to 8 carbon atoms.

Any remaining living chain ends in the rubbery polymer can then optionally be coupled with a suitable coupling agent, such as a tin halide or a silicon halide. Typically tin tetrahalide or a silicon tetrahalide, such a tin tetrachloride, tin tetrabromide, silicon tetrachloride, or silicon tetrabromide, is preferred for use as the coupling agent. In another embodiment of this invention the living rubbery polymer is coupled before the functionalized terminator is added. However, in this scenario it is important to limit the level of coupling agent employed to an amount which is insufficient to couple with all of the living chain ends of the rubbery polymer (less than a stoichiometric level of the coupling agent is added). This is, of course, because it is critical for living chain ends to be available to react with the functionalized terminator which will be added in a subsequent step.

After the rubbery polymer has been treated with the functionalized terminator and has optionally been coupled any remaining living chain ends are killed. A wide variety of organic and inorganic acids can be used for this purpose. For instance, inorganic acids, such as hydrochloric acid or sulfuric acid can be used. However, it is typically preferred to utilize an organic acid, such as a carboxylic acid, for this purpose. The carboxylic acids that can be used are typically of the structural formula: R—COOH, wherein R represents a hydrocarbyl moiety containing from 1 to about 30 carbon atoms, such as acetic acid or stearic acid. It is normally preferred for such carboxylic acids to contain from about 10 to about 25 carbon atoms, and more preferably from about 15 to 20 carbon atoms. Stearic acid is highly preferred.

The acid and the water can be added to the polymerization medium separately or as a mixed stream. It is typically preferred to add the water and the acid separately since the acid may not be water soluble. In any case, this addition will be done under conditions of agitation to mix the acid and the water throughout the polymerization medium. Normally from about 0.1 phr to about 5 phr of the acid and from about 0.1 phr to about 5 phr of water will be added. More typically, from about 0.5 phr to about 2 phr of the acid and from about 0.5 phr to about 2 phr of water will be added. Normally from about 0.1 phr to about 5 phr of the acid and from about 0.1 phr to about 5 phr of water will be added. More typically, from about 0.8 phr to about 1.2 phr of the acid and from about 0.8 phr to about 1.2 phr of water will be added.

The acid/water treatment has been unexpectedly found to result in the polymer being stable upon subsequent storage for a period of at least 2 weeks. More specifically, the rubbery polymer exhibits little or no Mooney creep after storage for 2 weeks. This is, of course, highly desirable in commercial scale production.

The rubbery polymer is then recovered from the organic solvent. The polybutadiene rubber can be recovered from the organic solvent and residue by any means, such as decantation, filtration, certification, and the like. It is often desirable to precipitate the rubbery polymer from the organic solvent by the addition of lower alcohols containing from about 1 to about 4 carbon atoms to the polymer solution. Suitable lower alcohols for precipitation of the rubbery polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. In any case, after the rubbery polymer is recovered from the solution, steam stripping is typically employed to reduce the level of volatile organic compounds in the polymer. It should be noted that steam stripping also kills any remaining living chain ends. The inert solvent and residual monomer can then be recycled for subsequent polymerization.

The functionalized rubber can then be finished and recovered from the polymerization medium using conventional techniques. In any case, it produces a functionalized rubber which is comprised of polymer chains of the structural formula:

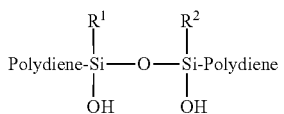

wherein Polydiene represents a polymer chain which is comprised of at least one diene monomer and wherein $R^1$ and $R^2$ can be the same or different and represent alkyl groups containing form 1 to 8 carbon atoms.

The functionalized polydiene rubbers of this invention can be compounded utilizing conventional ingredients and standard techniques. For instance, the functionalized polydiene rubber will typically be mixed with carbon black and/or silica, sulfur, fillers, accelerators, oils, waxes, scorch inhibiting agents, and processing aids. In most cases, the functionalized polydiene rubber will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 phr to 150 phr of at least one filler will be utilized with 30 phr to 80 phr being preferred. In most cases at least some carbon black will be utilized as the filler. The filler can, of course, be comprised totally of carbon black. Silica can be included in the filler to improve tear resistance and heat buildup. Clays and/or talc can be included in the filler to reduce cost. The productive rubber compounds will also normally include from 0.1 phr to 2.5 phr of at least one accelerator with 0.2 phr to 1.5 phr being preferred. Antidegradants, such as antioxidants and antiozonants, will generally be included in the rubber compound in amounts ranging from 0.25 phr to 10 phr with amounts in the range of 1 phr to 5 phr being preferred. Processing oils will generally be included in the blend in amounts ranging from 2 phr to 100 phr with amounts ranging from 5 phr to 50 phr being preferred. The compounded functionalized polydiene rubbers of this invention will also normally contain from 0.5 phr to 10 phr of zinc oxide with 1 phr to 5 phr being preferred. These blends can optionally contain from 0 phr to 10 phr of tackifier resins, 0 phr to 10 phr of reinforcing resins, 1 phr to 10 phr of fatty acids, 0 phr to 2.5 phr of peptizers, and 0 phr to 1 phr of scorch inhibiting agents.

An extending oil can also optionally be added to the cement of the rubbery polymer. Such extending oils will typically be added at a level which is within the range of 0 phr to 50 phr. In the case of oil extended rubbers the oil will more typically be added in an amount which is within the range of 10 phr to 45 phr, and will most typically be added at a level which is within the range of 20 phr to 35 phr.

To fully realize the total advantages of the functionalized polydiene rubbers of this invention, silica will normally be included in the tread rubber formulation. Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210 and Hi-Sil® 243, silicas available from Rhone-Poulenc, with, for example, designations of Z1165MP and Z165GR and silicas available from Degussa AG with, for example, designations VN2, VN3, and BV9000GR. Zeopol® 8745 silica from J. M. Huber Corporation, reportedly having an average total of about 13 hydroxyl groups per square nanometer of silica surface area and a ratio of geminal hydroxyl groups to said average total of about 0.23/1; a CTAB value of about 145 $m^2/g$ and a BET value of about 185 $m^2/g$ can also be used in the practice of this invention. Zeopol® 8715 silica from J. M Huber Corporation reportedly characterized by having an average total of about 18 hydroxyl groups per square nanometer surface of said silica and a ratio of geminal hydroxyl groups to said average total of about 0.27/1, a CTAB value of about 94 $m^2/g$ and a BET value of about 163 $m^2/g$ is another example of a silica that can be used in the practice of this invention.

The commonly employed siliceous pigments used in rubber compounding applications can be used as the silica. For instance, the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

The processing of the functionalized polydiene rubber is normally conducted in the presence of a sulfur containing organosilicon compound to realize maximum benefits. Examples of suitable sulfur containing organosilicon compounds are of the formula:

$$Z\text{-Alk-}S_n\text{-Alk-}Z$$

in which Z is selected from the group consisting of:

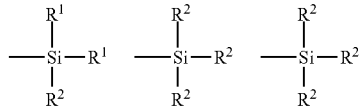

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis (methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is

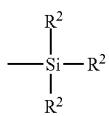

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

Rubber formulations made in accordance with this invention which includes silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature which is within the range of 140° C. to 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes. By utilizing the functionalized rubbers of this invention in tire tread compounds, traction characteristics can be improved without compromising tread wear or rolling resistance.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, synthesis of bis(dimethylamino)chloromethylsilane is illustrated. In a 100 mL Schlenk flask, 35 ml (0.3 mol) of trichloromethylsilane were diluted with THF, followed by the addition of 4.0 eq dimethylamine (600 ml, 2M solution in THF) in a bath which was maintained at OC. The reaction was stirred for 4 hours, filtered and concentrated under reduced pressure. The concentrated product solution was distilled to give 34 g of bis(dimethylamino) methylchlorosilane as a colorless liquid, boiling point: 72-74° C., 80 Torr. H NMR structures matches known material.

Example 2

In this example, termination of a polymerization reaction with a terminator of the invention is illustrated. In the procedure used 60 grams of a 15 weight percent solution of 1,3-butadiene in hexane was charged into a 4 oz bottle followed by 41 µl 2,2-di-tetrahydrofuryl propane (DTP, 1 eq) and 95 µl of 2.5 M n-BuLi/hexanes solution. The mixture was tumbled in a 65° C. water bath for 30 min, and then 0.24 mmol (1.1 eq to Li) of the aminochlorosilane prepared in Example 1 was added with additional reaction at 65° C. for another 35 minutes. An analogous control polymerization was done with trietthoxymethyl silane (TEMS) in place of the aminochlorosilane. The resulted polymer was quenched with 0.1 ml degassed methanol and sampled for characterization.

Coupling weight percentage and Mn was measured by GPC, the functionalization percentage of reacted chain end was measured by proton NMR, with the results attained being provided in Table 1.

TABLE 1

| Terminator | Base Mn | Coupling[1] | Single Chain Functionalization[2] |
|---|---|---|---|
| Example 1[3] | 48.9k | 12.6 wt. % | 96.3 wt. % |
| TEMS[4] | 35.3k | 34.9 wt. % | 81.3 wt. % |

[1]Example 1 terminator: 86.6% base chain, 12.6% coupled, 0.8%; TEMS: 63.2% base, 34.9% coupled, 1.9% trimer.
[2]Example 1 terminator: 96.3% functionalized, 3.2% unfunctiooanlized; TEMS: 81.3% functionalized, 16.8% unfunctionalized.
[3]bis(dimethylamino)chloromethylsilane of Example 1.
[4]triethoxymethyl silane (TEMS)

As seen in Table 1, the percentage of functionalized single polymer chains significantly improves with the inventive terminator as compared to the traditional alkoxysilane type terminating agent TEMS. Moreover, molecular weight control is improved with less coupling than traditional terminating agent.

While certain representative embodiments and details have been shown for the purpose of illustrating the subject invention, it will be apparent to those skilled in this art that various changes and modifications can be made therein without departing from the scope of the subject invention.

What is claimed is:

1. A functionalized rubber which is comprised of polymer chains of the structural formula:

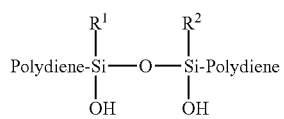

wherein Polydiene represents a polymer chain which is comprised repeat units of at least one diene monomer and wherein $R^1$ and $R^2$ can be the same or different and represent alkyl groups containing from 1 to 8 carbon atoms or moieties of the formula:

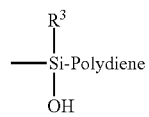

wherein $R^3$ represents alkyl groups containing from 1 to 8 carbon atoms.

2. The functionalized rubber of claim 1 wherein $R^1$ and $R^2$ represent alkyl groups containing from 1 to 4 carbon atoms.

3. The functionalized rubber of claim 2 wherein the Polydiene chains are polybutadiene rubber chains or styrene-butadiene rubber chains.

4. The functionalized rubber of claim 1 wherein at least one of $R^1$ and $R^2$ represents moieties of the formula:

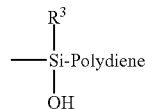

wherein $R^3$ represents an alkyl group containing from 1 to 8 carbon atoms.

5. The functionalized rubber of claim 3 wherein at least one of $R^1$ and $R^2$ represents an alkyl group containing from 1 to 4 carbon atoms.

6. The functionalized rubber of claim 5 wherein the Polydiene chains are polybutadiene rubber chains or styrene-butadiene rubber chains.

7. The functionalized rubber of claim 1 wherein the functionalized rubber exhibits essentially no Mooney creep upon storage at ambient temperature after a period of 2 weeks.

8. A pneumatic tire which is comprised of a generally toroidal-shaped supporting carcass with an outer circumferential tread, two spaced beads, at least one ply extending from bead to bead, sidewalls extending radially from and connecting said tread to said beads, wherein said circumferential tread is adapted to be ground-contacting, and wherein the tread and/or the sidewalls of the tire are comprised of the functionalized rubber as specified in claim 1.

9. The functionalized rubber of claim 1 wherein the Polydiene is a copolymer of 1,3-butadiene and a vinyl aromatic monomer containing from 50 weight percent to 95 weight percent of the 1,3-butadiene and from 5 weight percent to 50 weight percent of the vinyl aromatic monomer.

10. The functionalized rubber of claim 9 wherein the vinyl aromatic monomer is styrene.

11. The functionalized rubber of claim 9 wherein the vinyl aromatic monomer is α-methylstyrene.

12. The functionalized rubber of claim 9 wherein the vinyl aromatic monomer is 1-vinylnaphthalene.

13. The functionalized rubber of claim 1 wherein Polydiene is a polyisoprene rubber.

14. The functionalized rubber of claim 1 wherein Polydiene is a styrene-isoprene-butadiene rubber.

15. The functionalized rubber of claim 1 wherein Polydiene is an isoprene-butadiene rubber.

16. The functionalized rubber of claim 2 wherein the Polydiene chains are styrene-butadiene rubber chains containing 15 weight percent to 40 weight percent bound styrene and 60 weight percent to 85 weight percent bound 1,3-butadiene.

17. The functionalized rubber of claim 2 wherein the Polydiene chains are styrene-butadiene rubber chains containing 18 weight percent to 24 weight percent bound styrene and 76 weight percent to 82 weight percent bound 1,3-butadiene.

18. The functionalized rubber of claim 2 wherein the Polydiene chains are styrene-butadiene rubber chains containing 24 weight percent to 32 weight percent bound styrene and 68 weight percent to 76 weight percent bound 1,3-butadiene.

19. The functionalized rubber of claim 2 wherein the Polydiene chains are styrene-butadiene rubber chains containing 32 weight percent to 40 weight percent bound styrene and 60 weight percent to 68 weight percent bound 1,3-butadiene.

20. A pneumatic tire which is comprised of a generally toroidal-shaped supporting carcass with an outer circumferential tread, two spaced beads, at least one ply extending from bead to bead, sidewalls extending radially from and connecting said tread to said beads, wherein said circumferential tread is adapted to be ground-contacting, and wherein the tread and/or the sidewalls of the tire are comprised of the functionalized rubber as specified in claim 10.

* * * * *